United States Patent
Ahn

(10) Patent No.: US 9,716,298 B2
(45) Date of Patent: Jul. 25, 2017

(54) RECHARGEABLE BATTERY MODULE

(71) Applicant: SAMSUNG SDI CO., LTD., Yongin-si, Gyeonggi-do (KR)

(72) Inventor: Sang-Kyu Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 66 days.

(21) Appl. No.: 14/822,747

(22) Filed: Aug. 10, 2015

(65) Prior Publication Data

US 2016/0056514 A1 Feb. 25, 2016

(30) Foreign Application Priority Data

Aug. 25, 2014 (KR) ........................ 10-2014-0110962

(51) Int. Cl.
| | |
|---|---|
| *H01M 10/6553* | (2014.01) |
| *H01M 2/20* | (2006.01) |
| *H01M 10/6551* | (2014.01) |
| *H01M 2/30* | (2006.01) |
| *H01M 2/04* | (2006.01) |
| *H01M 10/647* | (2014.01) |

(52) U.S. Cl.
CPC ......... *H01M 10/6553* (2015.04); *H01M 2/04* (2013.01); *H01M 2/206* (2013.01); *H01M 2/30* (2013.01); *H01M 10/647* (2015.04); *H01M 10/6551* (2015.04)

(58) Field of Classification Search
CPC ........... H01M 10/6553; H01M 10/647; H01M 2/204; H01M 2/206; H01M 10/6551; H01M 2/30
See application file for complete search history.

(56) References Cited

U.S. PATENT DOCUMENTS

| | | | |
|---|---|---|---|
| 2009/0226800 A1* | 9/2009 | Ueshima ............. | H01M 2/1072 429/120 |
| 2010/0233915 A1* | 9/2010 | Kim ...................... | H01M 2/206 439/754 |

FOREIGN PATENT DOCUMENTS

| | | |
|---|---|---|
| JP | 2002-319388 A | 10/2002 |
| JP | 2013-105674 A | 5/2013 |

OTHER PUBLICATIONS

English machine translation of Japanese Publication No. JP 2002-319388 A, dated Oct. 31, 2002, 11 pages.
English machine translation of Japanese Publication No. JP 2013-105674 A, dated May 30, 2013, 18 pages.

* cited by examiner

*Primary Examiner* — Gregg Cantelmo
(74) *Attorney, Agent, or Firm* — Lewis Roca Rothgerber Christie LLP

(57) ABSTRACT

A rechargeable battery module includes a plurality of unit battery cells and a bus bar interconnecting a first electrode terminal of a first unit battery cell of the unit battery cells and a second electrode terminal of a second unit battery cell of the unit battery cells, the first electrode terminal having a first plurality of surfaces, the second electrode terminal having a second plurality of surfaces, and the bus bar having a third plurality of surfaces, the first plurality of surfaces being configured to face and make surface contact with corresponding ones of the third plurality of surfaces, the second plurality of surfaces being configured to face and make surface contact with corresponding ones of the third plurality of surfaces, and the first, second, and third pluralities of surfaces facing along a plurality of directions.

14 Claims, 9 Drawing Sheets

RECHARGEABLE BATTERY MODULE

CROSS-REFERENCE TO RELATED APPLICATION

This application claims priority to and the benefit of Korean Patent Application No. 10-2014-0110962 filed in the Korean Intellectual Property Office on Aug. 25, 2014, the entire contents and disclosure of which are incorporated herein by reference.

BACKGROUND

1. Field

Embodiments of the present invention relate to a rechargeable battery module that is capable of improving contact resistance characteristics between an electrode terminal and a bus bar and improving heat generation characteristics at a contact surface between the electrode terminal and the bus bar.

2. Description of the Related Art

A rechargeable battery differs from a primary battery in that it can be repeatedly charged and discharged, while a primary battery is incapable of being recharged.

A low-capacity rechargeable battery is generally used in small portable electronic devices such as mobile phones, notebook computers, and camcorders, while a high-capacity rechargeable battery may be used as a power source for driving a motor of a hybrid vehicle, an electric vehicle, etc.

The rechargeable battery may be used in small electronic devices as a single cell battery, or in motor-driving power sources, etc. as a battery module in which a plurality of battery cells are electrically coupled.

As an example, a rechargeable battery module may be formed by connecting electrode terminals of unit battery cells with bus bars.

Contact resistance is formed between the electrode terminal and the bus bar that contact each other, and the contact resistance generates heat (e.g., resistive heating due to electrical current flowing through contact resistance at the contact location).

As such, as the heat is generated at a contact surface between the electrode terminal and the bus bar, the life-spans of the unit battery cells and the rechargeable battery module deteriorate, and the rechargeable battery module may stop operating due to a high temperature protection feature.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention relate to a rechargeable battery module that is capable of reducing contact resistance between an electrode terminal and a bus bar and capable of reducing heat generation at a contact surface between the electrode terminal and the bus bar.

An exemplary embodiment of the present invention provides a rechargeable battery module, including: a plurality of unit battery cells; and a bus bar for interconnecting electrode terminals of the unit battery cells. The electrode terminals and the bus bar are configured to face and make surface contact with each other in multiple directions.

An electrode terminal of the electrode terminals may include: a bolt terminal electrically coupled to an electrode assembly of a unit battery cell of the unit battery cells; and a plate terminal fastened to the bolt terminal outside of a terminal hole in a cap plate of the unit battery cell, wherein plate terminal and the bus bar may be configured to face and make surface contact with each other in multiple directions when the bus bar is disposed on the plate terminal and a nut is fastened to the bolt terminal.

An electrode terminal of the electrode terminals may include a plate terminal outside of a terminal hole in the cap plate of a unit battery cell of the unit battery cells, and the plate terminal and the bus bar may be configured to face and make surface contact with each other along the plurality of directions when the bus bar is fastened to a top surface of the plate terminal.

The bus bar may have a first concave groove and a first protruding portion extending toward the plate terminal, and the plate terminal may have a second concave groove and a second protruding portion that are directed toward the first protruding portion and the first concave groove to be respectively coupled thereto.

The first protruding portion may have a pitch and may have a first inclined surface having a first inclination angle with respect to a plane of the bus bar, and the second protruding portion may have a second inclined surface having a second inclination angle with respect to a plane of the plate terminal to make surface contact with the first inclined surface.

The first inclination angle may be less than or equal to the second inclination angle.

A bottom of the first concave groove and an end portion of the second protruding portion may make surface contact with each other in opposite directions.

The first protruding portion may be symmetrically formed with the first inclined surfaces at opposite lateral sides of the first concave groove, and the second protruding portion may be symmetrically formed with the second inclined surfaces at opposite lateral sides of the second concave groove.

At least one of the first inclined surface of the first protruding portion and the second inclined surface of the second protruding portion may have a convexly curved cross section.

The second protruding portion may have a symmetric cross-section with the second inclined surfaces at opposite lateral sides of the second concave groove, and the first protruding portion may have a symmetric and convexly curved cross-section with the first inclined surfaces at opposite lateral sides of the first concave groove.

The bus bar may be formed of a material having the same or less hardness than that of the plate terminal.

The first protruding portion and the first concave groove may interconnect the electrode terminal of the unit battery cell to another electrode terminal of another unit battery cell of the unit battery cells.

The bus bar may have a plurality of cooling fins that extend from a surface of the bus bar opposite to the surface on which the first protruding portion and the first concave groove are disposed, the cooling fins extending along an extending direction of the first protruding portion, and wherein the cooling fins may be spaced apart from each other in a direction that crosses the extending direction.

According to one exemplary embodiment of the present invention, the electrode terminals of the plurality of unit battery cells are coupled through the bus bar such that the electrode terminals and the bus bar are configured to face and make surface contact with each other, thereby having an effect of reducing the contact resistance between the electrode terminals and the bus bar.

Accordingly, the heat generation can be decreased at the contact surface between the electrode terminal and the bus bar.

DETAILED DESCRIPTION

Figure 1:
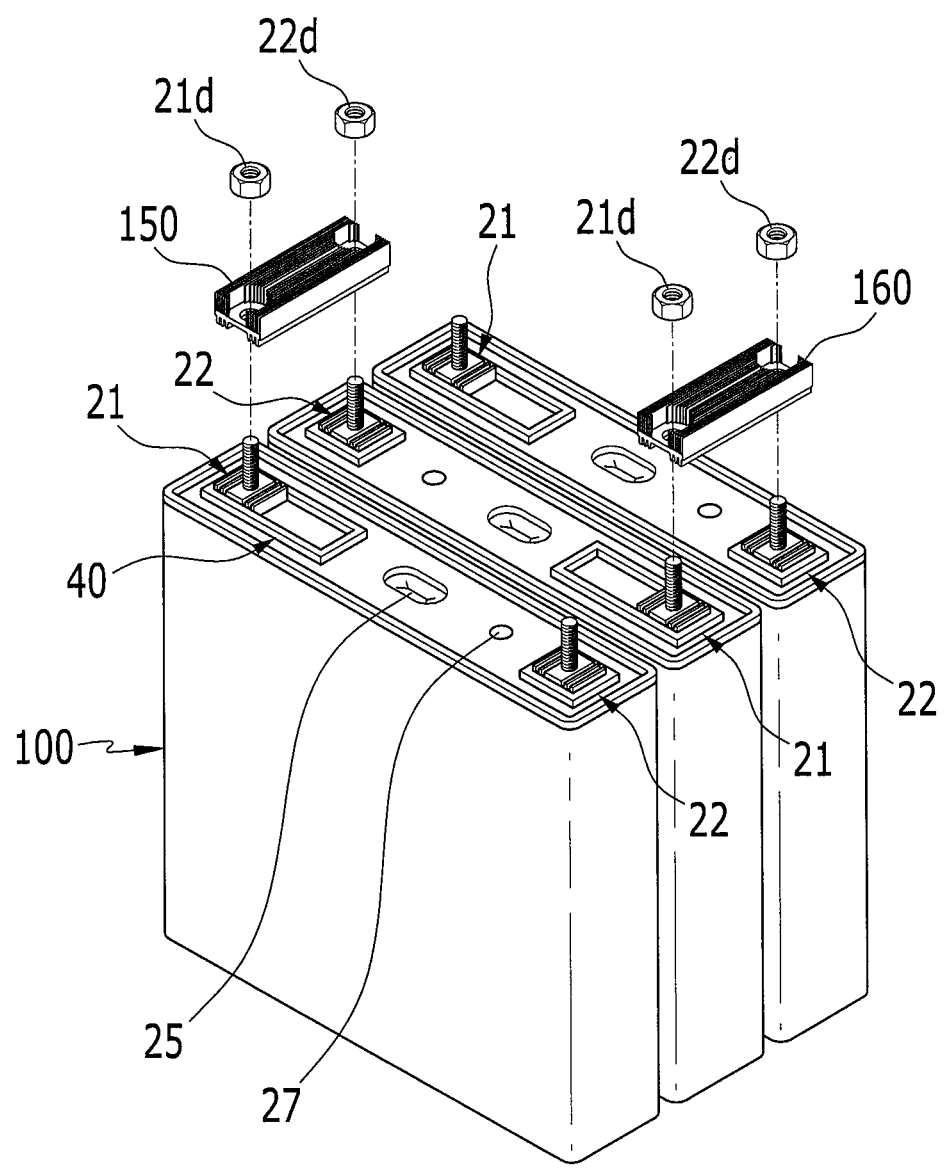
FIG. 1 is a perspective view of a rechargeable battery module according to a first exemplary embodiment of the present invention.

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

FIG. 1 is a perspective view of a rechargeable battery module according to a first embodiment of the present invention.

Referring to FIG. 1, the rechargeable battery module according to one embodiment includes unit battery cells 100 including rechargeable batteries, and bus bars 150 and 160 configured to connect the adjacently disposed unit battery cells 100 in series or in parallel.

Two or more of unit battery cells 100 may be provided and may be connected in series or in parallel to form the rechargeable battery module, and for the sake of convenience, in one embodiment, three unit battery cells 100 are connected in series through the two bus bars 150 and 160 to form the rechargeable battery module.

The bus bar 150 at one side (to the left of FIG. 1) electrically couples a first electrode terminal 21 and a second electrode terminal 22 of two of the unit battery cells 100 to each other, and the bus bar 160 at the other side (to the right of FIG. 1) electrically couples a first electrode terminal 21 and a second electrode terminal 22 of two of the unit battery cells 100.

The first and second electrode terminals 21 and 22 and the bus bars 150 and 160 are connected to face and make surface contact with each other in a plurality of directions.

For example, the first and second electrode terminals 21 and 22 and the bus bars 150 and 160 are connected or combined to have a large (or maximized) contact area therebetween within an area (e.g., a predetermined area).

Accordingly, the contact resistances between the first and second electrode terminals 21 and 22 and the bus bars 150 and 160 decrease (e.g., may be smaller than in comparable devices).

In addition, heat generation at areas where the first and second electrode terminals 21 and 22 and the bus bars 150 and 160 contact each other may be reduced.

Hereinafter, for the sake of convenience, the first electrode terminal 21 will be referred to as a negative electrode terminal, and the second electrode terminal 22 will be referred to as a positive electrode terminal. However, embodiments of the present invention are not limited thereto. For example, the first electrode terminal 21 may be a positive electrode terminal and the second electrode terminal 22 may be a negative electrode terminal. As another example, both the first electrode terminal 21 and the second electrode terminal may both be positive electrode terminals or they may both be negative electrode terminals.

The two bus bars 150 and 160 respectively form current paths that interconnect the negative and positive electrode terminals 21 and 22 in two adjacent unit battery cells 100.

Figure 2:
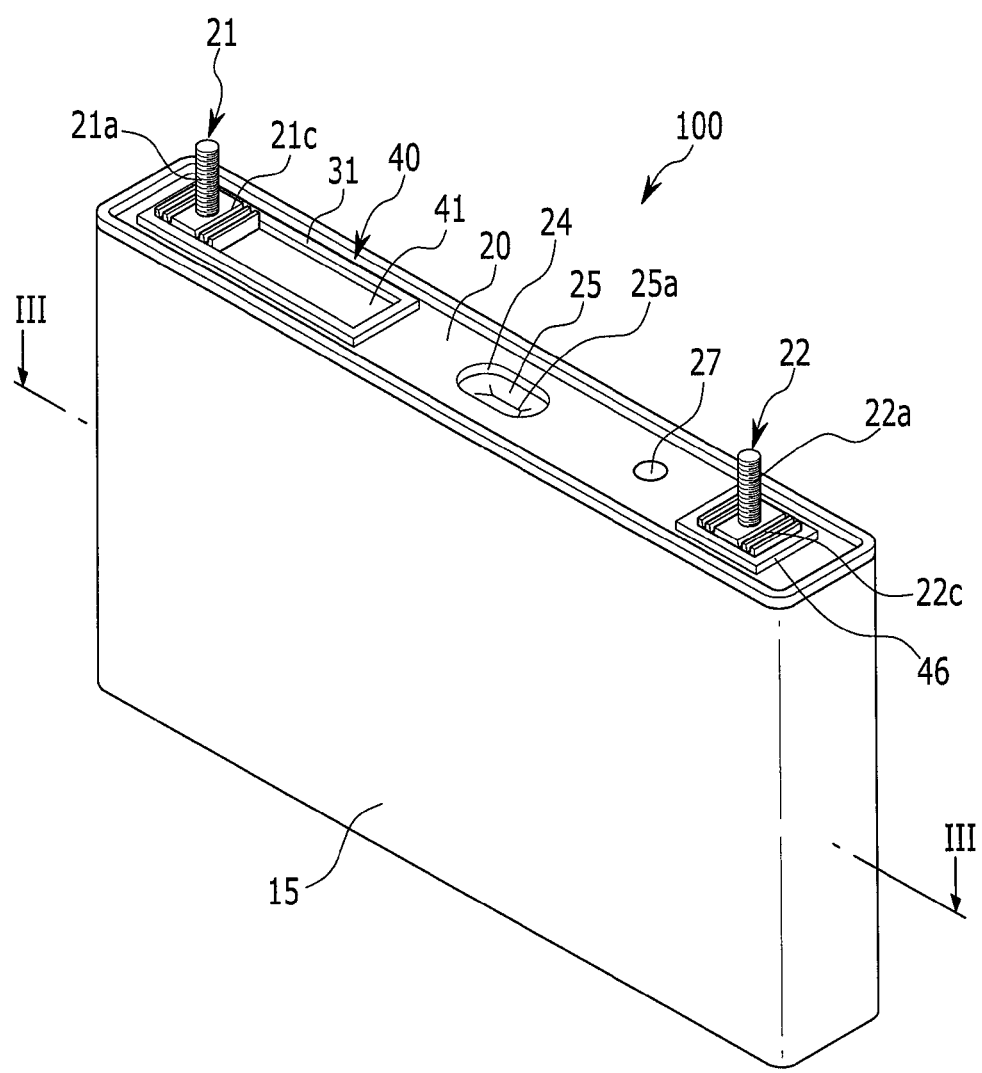
FIG. 2 is a perspective view of a unit battery cell applicable to the rechargeable battery module of FIG. 1.
Figure 3:
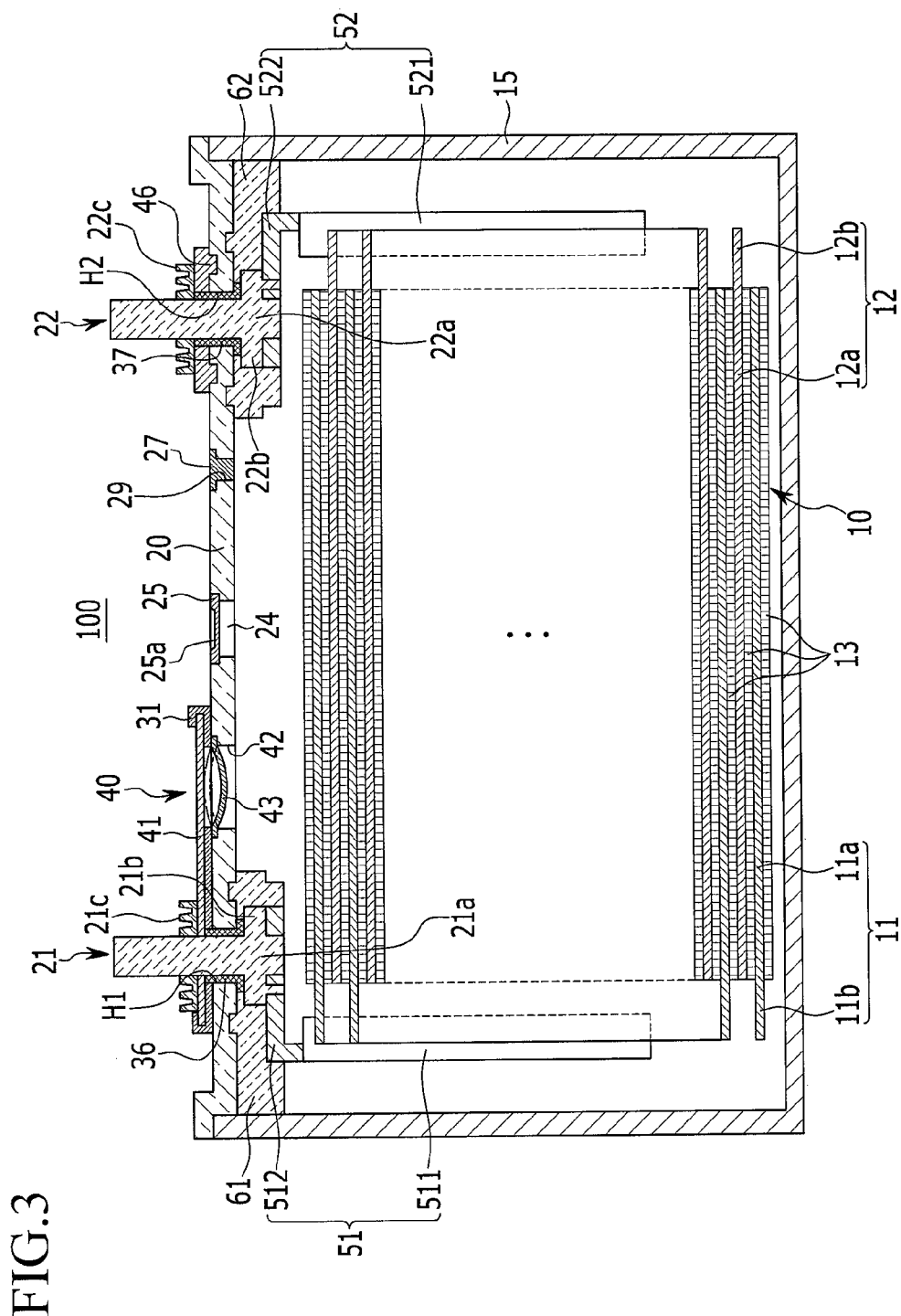
FIG. 3 is a cross-sectional view of FIG. 2 taken along the line III-III.

FIG. 2 is a perspective view of a unit battery cell applicable to the rechargeable battery module of FIG. 1, and FIG. 3 is a cross-sectional view of FIG. 2 taken along the line III-III.

Referring to FIGS. 2 and 3, each unit battery cell 100 includes: an electrode assembly 10 for charging and discharging a current; a case 15 for accommodating the electrode assembly 10; a cap plate 20 for sealing an opening of the case 15; first and second lead tabs 51 and 52 that are coupled to the electrode assembly 10 (for convenience, hereinafter referred to as "negative and positive electrode lead tabs"); the negative and positive electrode terminals 21 and 22 that are coupled to the negative and positive electrode lead tabs 51 and 52 and are installed to penetrate the cap plate 20; and an external short-circuit portion 40 that is provided at the negative electrode terminal 21.

For example, a first electrode 11 (hereinafter referred to as a "negative electrode") and a second electrode 12 (hereinafter referred to as a "positive electrode") are disposed at opposite sides of a separator 13, which is an insulator, and the positive electrode 12, the negative electrode 11, and the separator 13 are spirally wound in a jelly-roll state to form the electrode assembly 10.

The positive and negative electrodes 11 and 12 respectively include coated regions 11a and 12a where an active material is coated on current collectors made of a metal plate, and uncoated regions 11b and 12b where an active material is not coated thereon and which are formed as exposed current collectors.

The uncoated region 11b of the negative electrode 11 is formed at one end portion of the negative electrode 11 along the wound negative electrode 11.

The uncoated region 12b of the positive electrode 12 is formed at one end portion of the positive electrode 12 along the wound positive electrode 12.

Thus, the uncoated regions 11b and 12b are respectively disposed at opposite end portions of the electrode assembly 10.

For example, the case 15 is substantially formed as a cuboid (or rectangular prism) having a space for accommodating the electrode assembly 10 and an electrolyte solution, and is formed with the opening for connecting inner and outer spaces at one side of the cuboid.

The opening allows the electrode assembly 10 to be inserted into the case 15.

The cap plate 20 is installed at the opening of the case 15 to seal the case 15.

For example, the case 15 and the cap plate 20 may be formed of the same material (e.g., aluminum), and may be firmly welded to each other.

In addition, the cap plate 20 is provided with an electrolyte injection opening 29, a vent hole 24, and terminal holes H1 and H2.

After combining the cap plate 20 to the case 15, the electrolyte injection opening 29 allows the electrolyte solution to be injected into the case 15.

After being injected with the electrolyte solution, the electrolyte injection opening 29 is sealed with a sealing cap 27.

The vent hole 24 is sealed with a vent plate 25 so as to discharge internal pressure of the rechargeable battery 100.

The vent plate 25 is ruptured to open the vent hole 24 when the internal pressure of the rechargeable battery 100 reaches a pressure (e.g., a predetermined pressure).

The vent plate 25 is provided with a notch 25a that controls the rupture (e.g., controls the pressure at which the vent plate 25 ruptures).

The negative and positive terminals 21 and 22 are respectively provided in the terminal holes H1 and H2 of the cap plate 20, and are electrically coupled to the electrode assembly 10 through the negative and positive electrode lead tabs 51 and 52, respectively.

For example, in one embodiment, the negative terminal 21 is electrically coupled to the negative electrode 11 of the electrode assembly 10, while the positive terminal 22 is electrically coupled to the positive electrode 12 of the electrode assembly 10.

Thus, the electrode assembly 10 is drawn out of the case 15 through the negative and positive terminals 21 and 22.

Because the negative and positive terminals 21 and 22 have the same structure inside of the cap plate 20, the same structure will be described together while structures different from each other will be separately described because they have the different structures outside of the cap plate 20.

The negative and positive terminals 21 and 22 include bolt terminals 21a and 22a that are respectively installed at the terminal holes H1 and H2 of the cap plate 20, flanges 21b and 22b that are widely formed (or have a wide shape) inside of the cap plate 20 while being integrally formed with the bolt terminals 21a and 22a, and plate terminals 21c and 22c that are connected to the bolt terminals 21a and 22a by being screw-coupled or welded while being disposed outside of the cap plate 20.

By disposing the bus bars 150 and 160 on top surfaces of the plate terminals 21c and 22c and fastening nuts 21d and 22d to the bolt terminals 21a and 22a that penetrate the bus bars 150 and 160, the plate terminals 21c and 22c and the bus bars 150 and 160 are configured to face and make surface contact with each other.

In this case, the plate terminals 21c and 22c and the bus bars 150 and 160 are configured to face and make surface contact with each other in a plurality of directions.

A structure in which they make surface contact with each other in a plurality of directions will be more specifically described with reference to FIGS. 4 and 7.

Negative and positive gaskets 36 and 37 are respectively provided between the bolt terminals 21a and 22a of the negative and positive terminals 21 and 22 and the inner sides of the terminal holes H1 and H2 of the cap plate 20 to seal and electrically insulate between the bolt terminals 21a and 22a of the negative and positive terminals 21 and 22 and the cap plate 20.

The negative and positive electrode gaskets 36 and 37 are provided such that they are further elongated (or extend) between the flanges 21b and 22b and the inner side of the cap plate 20, and further seal and electrically insulate between the flanges 21b and 22b and the cap plate 20.

For example, by installing the negative and positive terminals 21 and 22 at the cap plate 20, the negative and positive electrode gaskets 36 and 37 prevent leakage of the electrolyte solution through the terminal holes H1 and H2.

The negative and positive electrode lead tabs 51 and 52 are provided with current collecting portions 511 and 521 at one side that are substantially vertically bent, and connecting portions 512 and 522 connected thereto.

The connecting portions 512 and 522 are electrically coupled to the negative and positive terminals 21 and 22, and the current collecting portions 511 and 521 are electrically coupled to the negative and positive electrodes 11 and 12 of the electrode assembly 10.

For example, by combining the connecting portions 512 and 522 of the negative and positive electrode lead tabs 51 and 52 with lower end portions of the bolt terminals 21a and 22a and then caulking the lower end portions, the connecting portions 512 and 522 of the negative and positive electrode lead tabs 51 and 52 are supported by the flanges 21b and 22b and are connected to the lower end portions of the bolt terminals 21a and 22a.

Negative and positive insulating members 61 and 62 are respectively installed between the connecting portions 512 and 522 of the negative and positive electrode lead tabs 51 and 52 and the cap plate 20 to insulate therebetween.

Further, the negative and positive insulating members 61 and 62 are coupled to the cap plate 20 at one side thereof and enclose or surround the connecting portions 512 and 522 of the negative and positive electrode lead tabs 51 and 52, the bolt terminals 21a and 22a, and the flanges 21b and 22b at the other side thereof, thereby stabilizing a connecting structure between them.

The external short-circuit portion 40 will be described in connection with the plate terminal 21c of the negative terminal 21, and a top plate 46 will be described in connection with the plate terminal 22c of the positive terminal 22.

The external short-circuit portion 40 adjacent to the negative electrode terminal 21 includes a connection plate 41 and a membrane 43 that are disposed to be separated or short-circuited depending on the internal pressure of the unit battery cell 100.

The connection plate 41 is disposed outside of the cap plate 20 while being electrically coupled to the bolt terminal 21a of the negative terminal 21 and interposing an insulating member 31.

The insulating member 31 is disposed between the connection plate 41 and the cap plate 20 to insulate the connection plate 41 from the cap plate 20.

For example, the cap plate 20 maintains an electrically insulated state with the negative terminal 21.

The connection plate 41 and the plate terminal 21c are coupled or combined to an upper part of the bolt terminal 21a such that the plate terminal 21c is screw-coupled to the bolt terminal 21a, or coupled portions of the connection plate 41 and the plate terminal 21c are welded to combine or couple the connection plate 41 and the plate terminal 21c to the bolt terminal 21a.

Thus, the connection plate 41 and the plate terminal 21c are fastened to the cap plate 20 with the insulating member 31 interposed therebetween and are thus insulated from each other.

In this case, the bolt terminal 21a protrudes above the plate terminal 21c.

The membrane 43 is installed at a short-circuit hole 42 that is formed at (e.g., welded to) the cap plate 20, and seals the short-circuit hole 42.

While being connected to the negative terminal 21, the connection plate 41 is disposed such that it is elongated or extends above and along the membrane 43.

Thus, the connection plate 41 and the membrane 43 correspond to the short-circuit hole 42, face each other to maintain a separated state therebetween (shown, for example, in FIG. 3 as a solid line), and may form a short-circuit state (shown, for example, in FIG. 3 as an alternate long and short dash line) in which the membrane 43 is inversely deformed when the internal pressure of the unit battery cells 100 increases.

The top plate 46 adjacent to the positive terminal 22 electrically couples together the plate terminal 22c of the positive terminal 22 and the cap plate 20.

For example, the top plate 46 is interposed between the plate terminal 22c and the cap plate 20, and is penetrated by the bolt terminal 22a.

The top plate 46 and the plate terminal 22c may be combined with or coupled to the bolt terminal 22a such that the plate terminal 22c is screw-coupled to the bolt terminal 22a, or the coupled portions of the plate terminal and the bolt terminal are welded to couple or combine the top plate 46 and the plate terminal 22c to the bolt terminal 22a.

The plate terminal 22c is installed outside of the cap plate 20 with the top plate 46 interposed therebetween.

In one embodiment, the bolt terminal 22a protrudes above the plate terminal 22c.

The positive electrode gasket 37 is installed such that it is further elongated (or extends) between the bolt terminal 22a and the top plate 46.

For example, the positive electrode gasket 37 blocks or prevents the bolt terminal 22a and the top plate 46 from being directly electrically coupled to each other.

Therefore, the bolt terminal 22a is electrically coupled to the top plate 46 and the cap plate 20 through the plate terminal 22c.

Figure 4:
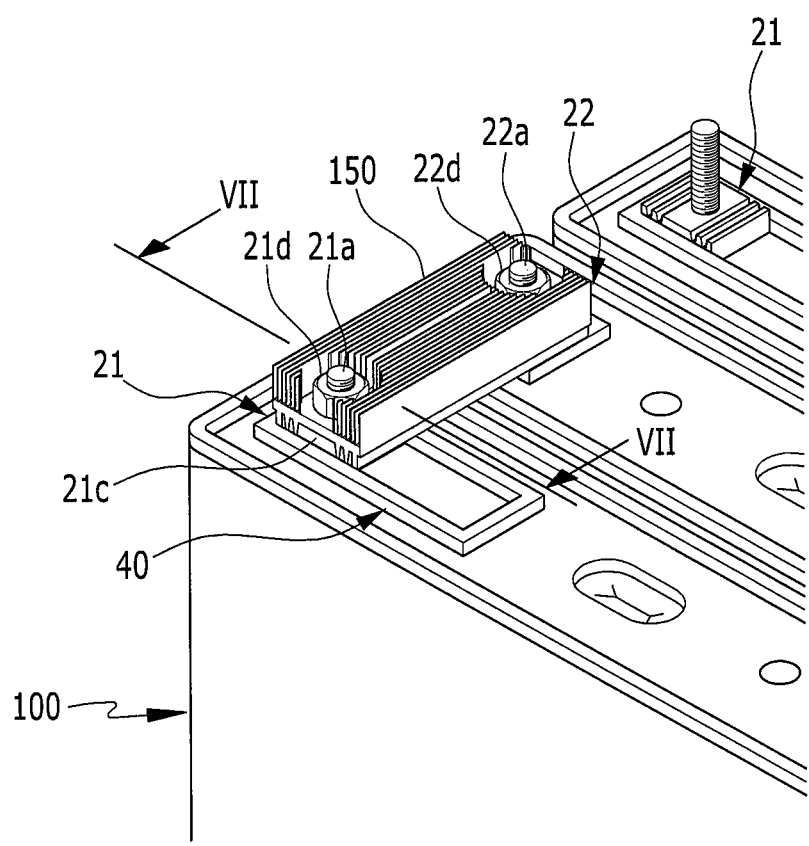
FIG. 4 is a partial perspective view illustrating a state of the rechargeable battery module of FIG. 1 in which electrode terminals are connected by a bus bar according to one embodiment of the present invention.
Figure 5:
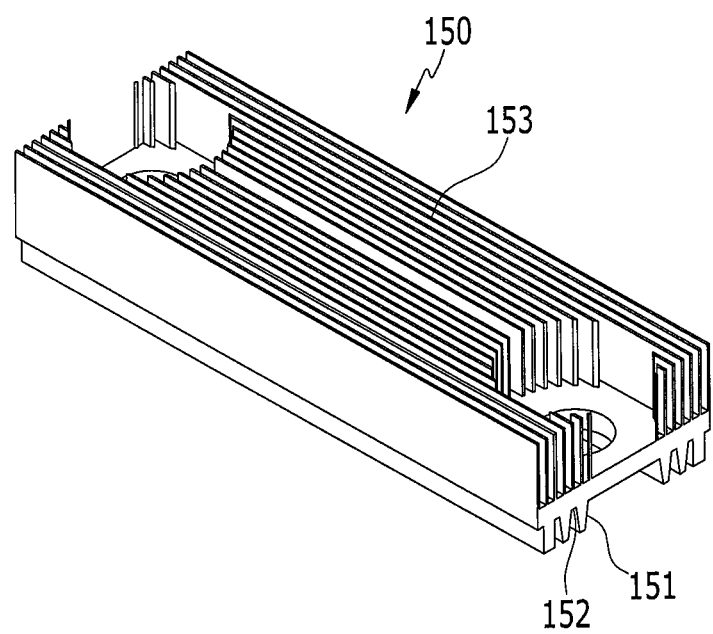
FIGS. 5 and 6 are perspective views of the bus bar of FIG. 4.
Figure 6:
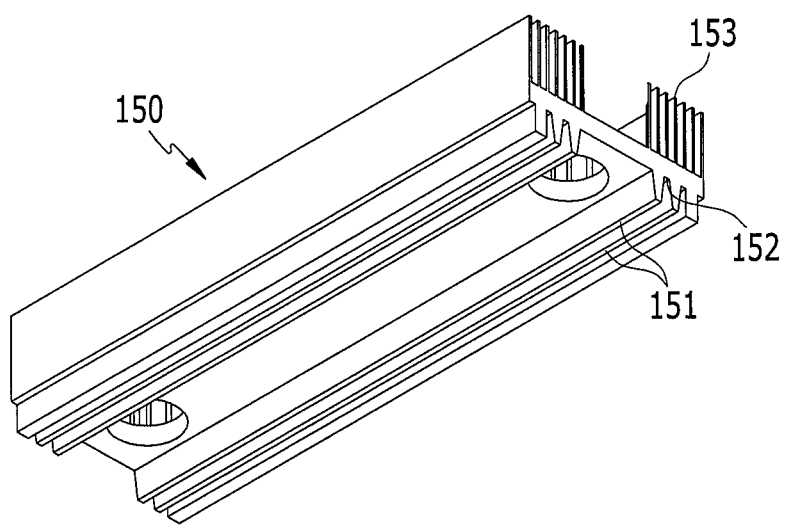
Figure 7:
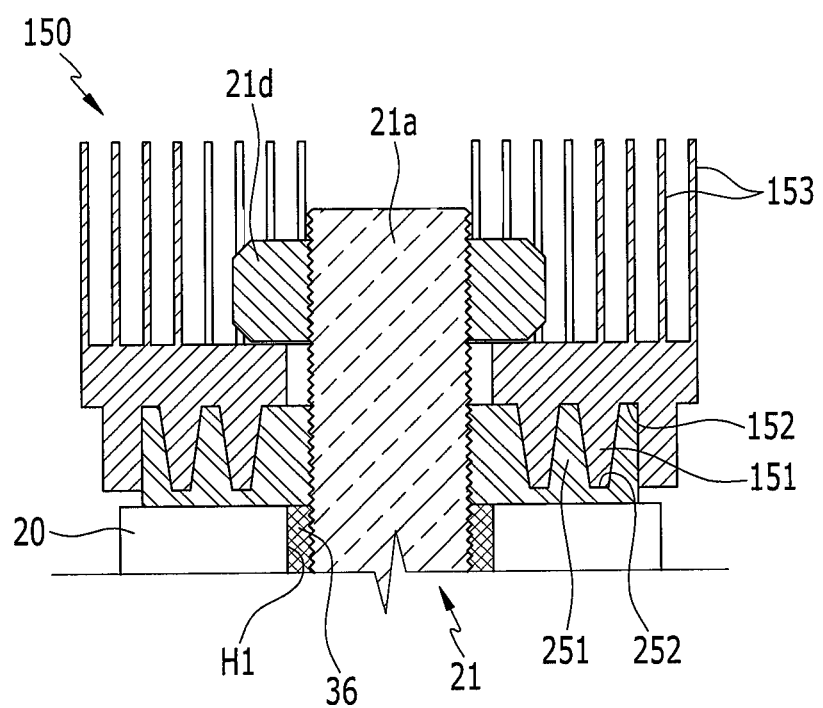
FIG. 7 is a cross-sectional view of FIG. 4 taken along the line VII-VII.

FIG. 4 is a partial perspective view illustrating a state of the rechargeable battery module of FIG. 1 in which the electrode terminals are connected by a bus bar, FIGS. 5 and 6 are perspective views of the bus bar, and FIG. 7 is a cross-sectional view of FIG. 4 taken along the line VII-VII.

Referring to FIGS. 4 and 7, when the bus bar 150 is disposed on the plate terminals 21c and 22c and the nuts 21d and 22d are then fastened to the bolt terminals 21a and 22a, the plate terminals 21c and 22c and the bus bar 150 is configured to face and make surface contact with each other in the plurality of directions.

For the sake of convenience, the negative electrode terminal 21 and the bus bar 150 will be exemplarily described.

The bus bar 150 is provided with a first protruding portion 151 directed toward or extending from a plane of the bus bar 150 in a direction toward the plate terminal 21c and a first concave groove 152, and the plate terminal 21c is provided with a second protruding portion 251 extending from a plane of the plate terminal 21c and a second concave groove 252 that are respectively combined with or coupled to the first concave groove 152 and the first protruding portion 151 theretoward.

Figure 8:
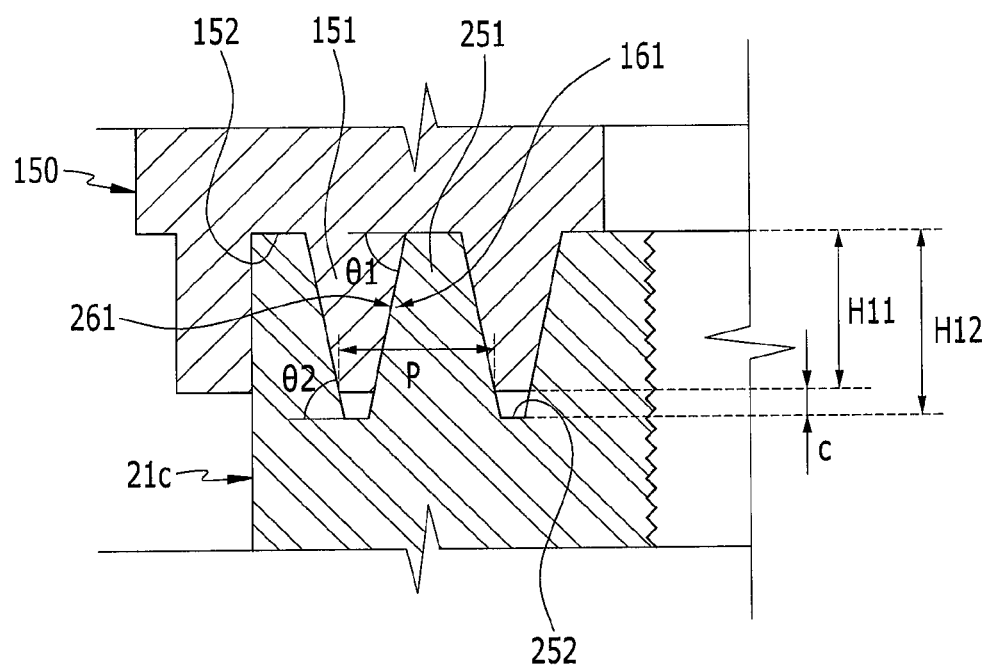
FIG. 8 is an enlarged cross-sectional view of coupled portions of the bus bar and the electrode terminals after they are fastened to each other according to one embodiment of the present invention.

FIG. 8 is an enlarged cross-sectional view of coupled portions of the bus bar and the electrode terminals after they are fastened (or combined or coupled) to each other.

Referring to FIGS. 7 and 8, the first protruding portion 151 is formed with a first inclined surface 161 that has a pitch P (e.g., a predetermined pitch) and is set to a first inclination angle θ1 with respect to the plane of the bus bar 150 at one side, and the second protruding portion 251 is formed with a second inclined surface 261 that is set to a second inclination angle θ2 with respect to the plane of the plate terminal 21c to make surface contact with the first inclined surface 161.

In one embodiment, the first inclination angle θ1 may be equal to or less than the second inclination angle θ2.

The bottom of the first concave groove 152 and the end portion of the second protruding portion 251 may make surface contact with each other in the opposite directions (upward and downward directions of FIG. 8).

Thus, the first inclined surface 161 of the first protruding portion 151 of the bus bar 150 makes surface contact with the second inclined surface 261 of the second protruding portion 251 of the plate terminal 21c at opposite lateral sides thereof in one direction (a direction perpendicular to the first and second inclined surfaces 161 and 261), and the first concave groove 152 of the bus bar 150 makes surface contact with the end portion of the second protruding portion 251 of the plate terminal 21c in the other direction (upward and downward directions of FIG. 8).

For example, the bus bar 150 makes surface contact with the plate terminal 21c in the plurality of directions (e.g., in three directions), and may increase the contact area therebetween.

A first height H11 of the first protruding portion 151 of the bus bar 150 may be smaller than a second height H12 of the second protruding portion 251 of the plate terminal 21c.

In this case, an end portion of the first protruding portion 151 may be spaced apart from the second concave groove 252 of the plate terminal 21c by a gap C.

When the plate terminal 21c and the bus bar 150 are installed at the bolt terminal 21a and the nut 21d is fastened to the bolt terminal 21a, the gap C allows the first inclined surface 161 of the bus bar 150 and the second inclined surface 261 of the plate terminal 21c to make maximum surface contact with each other.

When the nut is fastened to the bolt terminal, because the first and second protruding portions are formed of different materials and hardness of either one of the first and second protruding portions is relatively low (e.g., either one of the first and second protruding portions may be relatively soft), either one of the first and second protruding portions having the weaker hardness (or being softer) may be deformed to reduce or eliminate the gap.

In this embodiment, the contact surface between the bus bar and the plate terminal further increases, e.g., to maximize the amount of contact.

In addition, in one embodiment, the first protruding portion 151 of the bus bar 150 is formed with the first inclined surfaces 161 that are symmetrically formed at opposite lateral sides of the first concave groove 152, and the second protruding portion 251 of the plate terminal 21c is formed with the second inclined surfaces 261 that are symmetrically formed at opposite lateral sides of the second concave groove 252.

Thus, the contact resistance and the heat dissipation may be well-balanced at the opposite lateral sides of the first protruding portion 151 of the bus bar 150 and at the opposite lateral sides of the second protruding portion 251 of the plate terminal 21c.

Referring back to FIGS. 4 to 6, in one embodiment, the first protruding portion 151 and the first concave groove 152 of the bus bar 150 are formed such that they are elongated in or extend along a direction to connect the negative and positive electrode terminals 21 and 22 of the adjacent unit battery cells 100.

Because the first protruding portion 151 and the first concave groove 152 not only increase the contact area with the plate terminal 21c but are also separated from the unit battery cells 100 at regions where the negative and positive electrode terminals 21 and 22 are not disposed, the heat generated and transferred from the plate terminals 21c and 22c can be discharged to improve the heat dissipating performance of the bus bar 150.

In addition, the bus bar 150 is provided with a plurality of cooling fins 153 that are elongated toward and extend along an extending direction in which the first protruding portion 151 extends from the other surface opposite to the surface where the first protruding portion 151 and the first concave portion (or concave groove) 152 are disposed, and are disposed to be spaced apart from each other in a direction that crosses the extending direction.

The cooling fins 153 may create or allow a flow of cooling gas (e.g., air) to cool (or effectively cool) the bus bar 150.

Another embodiment of the present invention will now be described.

Compared with the configurations of the aforementioned embodiment, a description of the same or substantially similar configurations or arrangements of components will be omitted while different configurations or arrangements of components will be described.

Figure 9:
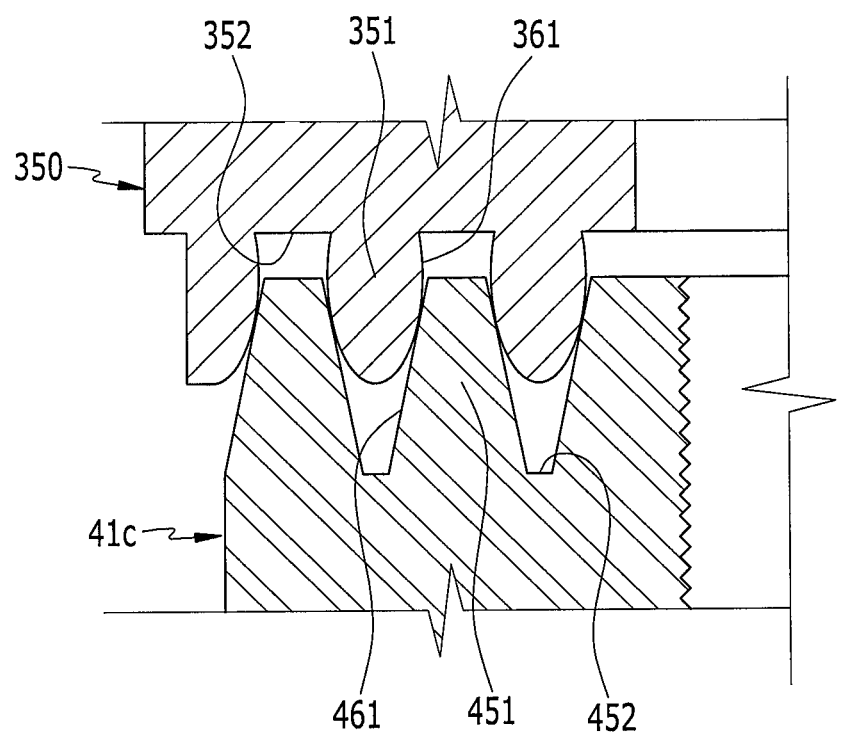
FIG. 9 is an enlarged cross-sectional view of coupled portions of a bus bar and electrode terminals according to another exemplary embodiment before they are fastened to each other.

FIG. 9 is an enlarged cross-sectional view of a coupled portion in a state before a bus bar and electrode terminals according to another exemplary embodiment are fastened.

Referring to FIG. 9, at least either one of a first inclined surface 361 of a first protruding portion 351 and a second inclined surface 461 of a second protruding portion 451 may be formed as a convexly curved line or shape (e.g., the first protruding portion 351 or the second protruding portion 451 may have a convexly curved cross section).

In the embodiment of FIG. 9, the first inclined surface 361 of the first protruding portion 351 is formed as a convexly curved line, and the second inclined surface 461 of the second protruding portion 451 corresponding thereto is formed as a straight line.

As shown in the embodiment of FIG. 9, the first inclined surface 361 of the first protruding portion 351 is symmetrically formed at opposite lateral sides of a first concave groove 352, and the second inclined surface 461 of the second protruding portion 451 is symmetrically formed at opposite lateral sides of a second concave groove 452 such that it is inserted into the first concave groove 352.

The bus bar 350 may be formed of a material having the same or less hardness than that of a plate terminal 41c (e.g., the bus bar may be as soft as or softer than the plate terminal 41c).

When the bus bar 350 is installed at the plate terminal 41c and the nut 21d is fastened to the bolt terminal 21a, if the hardness of the bus bar 350 is less than that of the plate terminal 41c, the first inclined surface 361 of the first protruding portion 351 may be deformed according to a shape of the second inclined surface 461 of the second protruding portion 451.

For example, the bus bar 350 may be formed of aluminum, as is the plate terminal 41c.

When the first inclined surface 361 of the first protruding portion 351 is deformed from a state of FIG. 9 to the state of FIG. 8, the first inclined surface 361 of the first protruding portion 351 contacts the second inclined surface 461 of the second protruding portion 451, thereby increasing the contact area therebetween.

Thus, in the embodiment of FIG. 9, electrical resistance at the area where the bus bar 350 and the plate terminal 41c contact each other is reduced (e.g., due to the increased contact area), thereby decreasing the heat generation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

| Description of Symbols | |
|---|---|
| 10: electrode assembly | 11: first electrode (negative electrode) |
| 11a, 12a: coated region | 11b, 12b: uncoated region |
| 12: second electrode (positive electrode) | 13: separator |
| 15: case | 20: cap plate |
| 21: first electrode terminal (negative electrode terminal) | 21a, 22a: bolt terminal |
| 21b, 22b: flange | 21c, 22c, 41c: plate terminal |
| 21d, 22d: nut | 22: second electrode terminal (positive terminal) |
| 24: vent hole | 25: vent plate |
| 27: sealing cap | 29: electrolyte injection opening |
| 31: insulating member | 36, 37: negative, positive electrode gasket |
| 40: external short-circuit portion | 41: connection plate |
| 42: short-circuit hole | 43: membrane |
| 46: top plate | 51: first lead tab (negative electrode lead tab) |
| 52: second lead tab (positive electrode lead tab) | |
| 61, 62: negative, positive electrode insulating member | |
| 100: unit battery cell | 150, 160, 350: bus bar |
| 151, 351: first protruding portion | 152, 352: first concave groove |
| 153: cooling fin | 161, 361: first inclined surface |
| 251, 451: second protruding portion | 252, 452: second concave groove |
| 261, 461: second inclined surface | 511, 521: current collecting portion |

-continued

| Description of Symbols | |
|---|---|
| 512, 522: connecting portion | C: gap |
| H1, H2: terminal hole | H11, H12: first, second height |
| P: pitch | θ1, θ2: first, second inclination angle |

What is claimed is:

1. A rechargeable battery module comprising:
    a plurality of unit battery cells; and
    a bus bar for interconnecting electrode terminals of the unit battery cells, wherein the electrode terminals and the bus bar are configured to face and make surface contact with each other at opposite sides in multiple directions, the bus bar having a first protruding portion extending toward at least one of the electrode terminals and configured to make surface contact with a portion of the electrode terminals, the first protruding portion having a length along a first direction in a plane of the bus bar and a width along a second direction in the plane of the bus bar, the length of the first protruding portion extending between the electrode terminals interconnected by the bus bar.

2. The rechargeable battery module of claim 1, wherein an electrode terminal of the electrode terminals comprises:
    a bolt terminal electrically coupled to an electrode assembly of a unit battery cell of the unit battery cells; and
    a plate terminal fastened to the bolt terminal outside of a terminal hole in a cap plate of the unit battery cell,
    wherein the plate terminal and the bus bar are configured to face and make surface contact with each other in multiple directions when the bus bar is disposed on the plate terminal and a nut is fastened to the bolt terminal.

3. The rechargeable battery module of claim 1, wherein an electrode terminal of the electrode terminals comprises a plate terminal located outside of a terminal hole in a cap plate of a unit battery cell of the unit battery cells, and
    wherein the plate terminal and the bus bar are configured to face and make surface contact with each other along multiple directions when the bus bar is fastened to a top surface of the plate terminal.

4. The rechargeable battery module of claim 3, wherein the bus bar further has a first concave groove, and
    wherein the plate terminal has a second concave groove and a second protruding portion that are directed toward the first protruding portion and the first concave groove to be respectively coupled thereto.

5. The rechargeable battery module of claim 4, wherein the first protruding portion has a pitch and has a first inclined surface having a first inclination angle with respect to a plane of the bus bar, and the second protruding portion has a second inclined surface having a second inclination angle with respect to a plane of the plate terminal to make surface contact with the first inclined surface.

6. The rechargeable battery module of claim 5, wherein the first inclination angle is less than or equal to the second inclination angle.

7. The rechargeable battery module of claim 6, wherein a bottom of the first concave groove and an end portion of the second protruding portion are configured to make surface contact with each other in opposite directions.

8. The rechargeable battery module of claim 5, wherein the first protruding portion is symmetrically formed with the first inclined surfaces at opposite lateral sides of the first concave groove, and the second protruding portion is symmetrically formed with the second inclined surfaces at opposite lateral sides of the second concave groove.

9. The rechargeable battery module of claim 4, wherein the first protruding portion and the first concave groove interconnect the electrode terminal of the unit battery cell to another electrode terminal of another unit battery cell of the unit battery cells.

10. The rechargeable battery module of claim 9, wherein the bus bar has a plurality of cooling fins that extend from a surface of the bus bar opposite to the surface on which the first protruding portion and the first concave groove are disposed, the cooling fins extending along an extending direction of the first protruding portion, and
    wherein the cooling fins are spaced apart from each other in a direction that crosses the extending direction.

11. The rechargeable battery module of claim 1, wherein the at least one of the electrode terminals has a second protruding portion extending, in the first direction, the entire length of the at least one electrode terminal.

12. A rechargeable battery module comprising:
    a plurality of unit battery cells; and
    a bus bar for interconnecting electrode terminals of the unit battery cells, wherein the electrode terminals and the bus bar are configured to face and make surface contact with each other at opposite sides in multiple directions,
    wherein an electrode terminal of the electrode terminals comprises a plate terminal located outside of a terminal hole in a cap plate of a unit battery cell of the unit battery cells,
    wherein the plate terminal and the bus bar are configured to face and make surface contact with each other along multiple directions when the bus bar is fastened to a top surface of the plate terminal,
    wherein the bus bar has a first concave groove and a first protruding portion extending toward the plate terminal,
    wherein the plate terminal has a second concave groove and a second protruding portion that are directed toward the first protruding portion and the first concave groove to be respectively coupled thereto,
    wherein the first protruding portion has a pitch and has a first inclined surface having a first inclination angle with respect to a plane of the bus bar, and the second protruding portion has a second inclined surface having a second inclination angle with respect to a plane of the plate terminal to make surface contact with the first inclined surface, and
    wherein at least one of the first inclined surface of the first protruding portion and the second inclined surface of the second protruding portion has a convexly curved cross section.

13. The rechargeable battery module of claim 12, wherein the second protruding portion has a symmetric cross-section with the second inclined surfaces at opposite lateral sides of the second concave groove, and
    wherein the first protruding portion has a symmetric and convexly curved cross section with the first inclined surfaces at opposite lateral sides of the first concave groove.

14. The rechargeable battery module of claim 13, wherein the bus bar is formed of a material having the same or less hardness than that of the plate terminal.

* * * * *